Nov. 6, 1934.  T. A. MITCHELL  1,979,280
METHOD OF CHLORIDIZING ORE MATERIALS
Filed Dec. 2, 1932    3 Sheets-Sheet 1

Inventor
THOMAS A. MITCHELL
By Clayton L. Jenks
Attorney

Nov. 6, 1934.  T. A. MITCHELL  1,979,280
METHOD OF CHLORIDIZING ORE MATERIALS
Filed Dec. 2, 1932   3 Sheets-Sheet 2

Inventor
THOMAS A. MITCHELL
By Clayton L. Jenks
Attorney

Patented Nov. 6, 1934

1,979,280

UNITED STATES PATENT OFFICE 1,979,280

METHOD OF CHLORIDIZING ORE MATERIALS

Thomas A. Mitchell, Denver, Colo., assignor, by mesne assignments, to Hughes-Mitchell Processes, Incorporated, Denver, Colo., a corporation of Wyoming Application December 2, 1932, Serial No. 645,454

28 Claims. (Cl. 75—67)

This invention relates to a method of and an apparatus for chloridizing ore materials, and particularly for treating iron oxide, or an ore material containing the same, with hydrochloric acid gas for the purpose of forming iron chloride therein, as well as the chlorides of other chloridizable ore metal oxides which may be present.

It has been proposed heretofore to treat an ore material containing iron oxide with hydrochloric acid gas; and this has been accomplished by showering the ore material through a current of hydrochloric acid gas, as by tumbling it in a rotary tube, or by passing the gas over the ore material while it is moved progressively in shallow layers over a series of shelves by revolving rake arms. It has been supposed that the reaction should be carried on at a temperature below 100° C. or that at which ferric chloride reacts with oxygen or water and reforms iron oxide. In such a procedure, however, the water of reaction may condense and result in the production of a wet material. The presence of the large amount of water thus condensed has certain detrimental effects, and particularly that involved in dissolving the easily soluble deliquescent materials, such as zinc chloride, and causing them to form a thick, syrupy mass which coats the ore particles and closes the pores thereof and thus prevents further penetration of the chloridizing gas.

A primary object of my invention is to provide a more efficient and economical process than heretofore employed and which is especially adapted for the treatment of iron oxide alone or ore materials containing iron oxide, such as a roasted pyritic ore, and particularly ore materials containing iron oxide associated with difficultly chloridized compounds of valuable ore metals.

In accordance with my discovery, I have found that the rate of reaction of iron oxide and hydrochloric acid gas is accelerated as the temperature is raised above 100° C., and that the process is particularly efficient if the heat of formation of the ferric and ferrous chlorides is retained and caused to heat the ore material to a desired temperature below the point at which the iron chloride thus formed would be decomposed by heat in the absence of air. The temperature attained by this self-heating of the ore material is a function of the rate of reaction of the hydrochloric acid gas and iron oxide and I, therefore, employ the gas in a strong atmosphere and under conditions which serve to accumulate this heat of formation where most needed. This is accomplished by passing the gas into or through a deep bed of the iron oxide, or ore material containing the same, where it is caused to be absorbed therein. The gas and ore may be passed in a countercurrent or a concurrent flow, but it is desirable that the strong gas meet a considerable amount of the untreated pulverized ore quickly, so that the heat of reaction thus generated by the combination of the two reagents may be high at a given point and not be dissipated too soon or to such an extent as to lower the temperature of the ore material to a point below that of maximum efficiency of reaction.

Both air and water react with ferric and ferrous chlorides, serving to remove chlorine therefrom or to decompose them. I, therefore, propose to carry on the process under controlled air and moisture conditions, and preferably in such a manner as to prevent access of any material amount of air to the reaction zone and also to remove sufficient water so as to prevent the decomposition of any substantial portion of the iron chloride. An ore containing ferric and/or ferrous oxide, when chloridized under these conditions, produces a dry, fluffy powder which remains stable at a temperature as high as about 170 to 180° C., provided there is no material amount of air or moisture present. The melting point of ferric chloride lowers with an increase in the number of molecules of water of crystallization which are present. Hence, it is desirable to limit the amount of moisture which may form such water of crystallization, and especially when the iron chloride content is high. Water may, of course, be taken up as water of hydration or crystallization of various ore materials which may be present. The excess water is present as steam, which is removed from the reaction zone.

I have further noted that during the chloridization by this method of materials containing iron oxide by strong hydrochloric acid gas, there is an increase in volume of the iron compounds as chloridization proceeds. To avoid the material becoming packed together into a mass which is not readily permeated by the attacking gas, I propose to agitate or stir the mass during the reaction and at the same time to provide room for this expansion so as to keep the material in an open and porous condition.

The fresh iron oxide reacts rapidly with a strong atmosphere of hydrochloric acid gas, and thus produces a higher temperature than would be the case if a weak gas contacted with the fresh ore. Also, the rate of reaction is several times faster when the materials flow in a concurrent manner than when they flow in opposite directions. Owing to the rapidity of the absorption of the strong gas by the fresh iron oxide, the size of the reaction chamber and the area of contact between the two reagents may be considerably smaller than has heretofore been the case when the materials were caused to react in the cold condition.

It is important to conserve the heat which is is evolved during the reaction of the fresh materials and to maintain both the gas and the ore material in a dry condition, as distinguished from prior methods involving the gas being dissolved in the water of condensation and thus forming a solution of hydrochloric acid. I have found that the most efficient temperature for this purpose is considerably above 100° C., and preferably in the vicinity of but below that temperature at which the iron chloride will not be formed or would be dissociated by heat. This temperature is believed to be in the neighborhood of 180° C. for both ferric and ferrous chlorides. While the reaction may be carried on in a muffled chamber which permits control of the temperature by the application of heating or cooling fluids, I have found that this is not ordinarily necessary and that the rate of passage of the material through the reaction zone and the amount of reagent gas used will determine the maximum temperature.

It is, therefore, apparent that the size and shape of the apparatus are important in determining the temperature conditions. I preferably employ a reaction chamber in which the vertical dimension is much greater than the horizontal, as illustrated, so as to permit a rapid and complete absorption of the gas, which is conducive to the generation of the required temperature. The ore material containing the iron oxide being treated, is not in a shallow layer in such an apparatus but constitutes a deep bed presenting a maximum of surface area for contact with the strong gas and at the same time forming a compact body which holds the heat of formation of the chemical reactions. In order that the gas may permeate the iron oxide or the ore material containing the same, the material to be treated is pulverized to any suitable grain size, ranging from a finely divided dust to a coarse granular condition, the size depending largely upon the nature of the ore being treated and determining the rate of penetration of the gas.

This treatment will serve to chloridize the oxides of other metals besides iron, which may be present. The high temperature not only accelerates the formation of iron and other chlorides from such metal oxides, but it also aids in the attack of the iron chloride on the more refractory compounds, such as the sulfides, silicates and ferrates of zinc, which are chloridized with difficulty by hydrochloric acid gas. Under the conditions of its formation, the iron chloride appears to be very active in reacting directly with such compounds. Therefore, a further object of the invention is to treat a complex ore material, and particularly a roasted pyritic ore in such a manner that the ore metal values may be effectively chloridized.

The invention is particularly applicable to the treatment of a complex ore material containing an iron compound intermingled with other ore metal values. For example, a sulfide ore may contain iron and zinc, silver, lead or copper sulfides, together with compounds of other desired metals; and this invention is especially adapted for the treatment of complex iron-bearing ore materials. In the treatment of such a sulfide ore, I propose to roast the ore to leave the iron in either the ferrous or the ferric condition and then to treat the pulverulent roasted product with strong hydrochloric acid gas under conditions, as above specified, which produce ferous or ferric chloride.

Since ferric chloride is a more powerful chloridizing agent than is ferrous chloride, it is preferred to roast the ore under oxidizing conditions and to form ferric oxide and then produce ferric chloride therefrom. If, however, it is desired to produce and to use ferrous chloride, the ore may be roasted under suitable conditions with limited oxygen which causes the production of the lower oxide. In the commercial application of this procedure to ferrous oxide, it is found that a considerable amount of ferric chloride is also developed, thus increasing the efficiency of the process by the production of the chloride having the greater amount of combined chlorine.

The iron chloride serves for reacting directly with and chloridizing the refractory compounds in the ore, and especially the unroasted sulfides, as well as silicates, ferrates and other compounds of zinc and the other ore metals. This chloridizing treatment of the ore values takes place when the iron chloride is formed, and in the absence of any material amount of air or water. To complete this operation, the iron chloride may also be used in a subsequent step as a source of chlorine, which may be evolved as nascent chlorine or as hydrochloric acid gas. To this end, I may heat the ore material containing the iron chloride with air or oxygen in excess at a temperature above that at which the ferrous or ferric chloride will dissociate and form nascent chlorine, thereby developing a powerful chloridizing agent from the iron compound. If there is a large amount of combined water present, the reaction will proceed towards the development of hydrochloric acid gas, together with some chlorine, depending upon whether or not the process is carried on under oxidizing conditions. It is preferred to minimize the quantity of water present and to carry on the process with an excess of oxygen in order that the iron oxide may be ultimately recovered as ferric oxide and the combined chlorine in the iron chloride will be evolved as nascent chlorine.

This process is commercially economical for treating not only the ore materials but also iron oxide alone, and especially where it is intended to chloridize only a portion of the oxide, and in which the untreated oxide acts as a diluent for the remaining materials. In the ore, there are quartz, various silicates and other materials constituting the gangue which serve to dilute the iron oxide. These diluents render the ore or oxide more easily permeable to the gases and otherwise aid in keeping the mass open and porous and furthering the reaction. Iron chloride is soluble in water and so may be readily recovered from the unconverted oxide by the simple expedient of leaching the material after it has been treated sufficiently with the gas.

In order that the invention may be more fully understood, the process will be described with reference to a special chloridization operation and then, its applicability to a complex ore will be shown.

Referring now to the drawings:

Fig. 1 is a vertical sectional view, taken substantially on the line 1—1 of Fig. 2, of one type of chloridizing apparatus in which this process may be carried on;

Fig. 2 is a section on the line 2—2 of Fig. 1;

Fig. 3 is a detail showing a modified form of apparatus for cleaning out the gas ports;

The drawings show two types of apparatus which are particularly suited for carrying on this process of treating iron oxide, either in a pure condition or containing various impurities intermixed therewith, or an ore material containing iron oxide in the ferric or ferrous condition which is intermixed with various inert or chloridizable compounds. One feature of the process involves introducing the strong reagent gas into a deep bed of the pulverized iron oxide, as distinguished from the treatment of shallow layers of material which are being moved across shelves or the inner surface of a rotary drum. The gas should be fed into this bed at such a point that a considerable portion of the heat of reaction can be stored up in the material itself and used to heat it to the desired temperature condition but, if desired, extraneous heat may be employed for the purpose. The gas and ore flow may be so regulated that the gas is substantially wholly absorbed by the iron oxide, or it may be found more efficient in some cases to remove the weak residual gas from the reaction zone along with the steam. Air seals are provided so as to prevent the decomposition of the iron chloride, which is being formed at a temperature above its normal decomposition point when in the presence of air. I have, therefore, so constructed the apparatus that these various important features of the process may be carried on efficiently, as herein explained.

Figures 1, 2, 3:
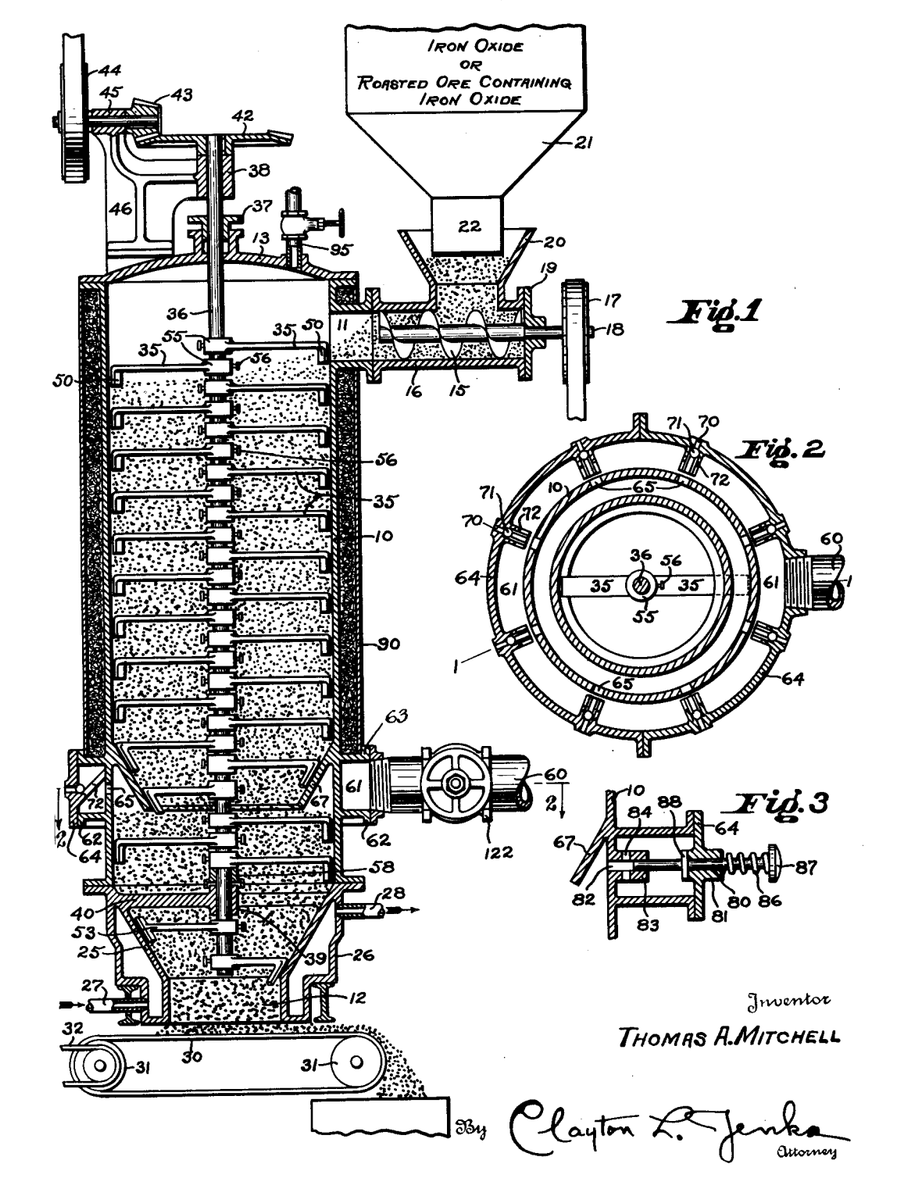

As shown in Figs. 1 and 2, I have provided a casing 10 made of suitable material capable of withstanding the gaseous and other reagents employed in the process. The ore material is introduced into the upper end thereof through an inlet port 11, and it passes from the lower end of the apparatus through an outlet port 12. The upper end of the chamber 10 is provided with a cover 13 suitably secured to the vertical wall of the chamber. When the pulverulent iron oxide is treated with hydrochloric acid gas in this process, it expands to a considerable extent, and provision must therefore be made for removing the material from the reaction chamber at a faster rate from that at which it is fed into the apparatus. Therefore, the devices for feeding and removing the material are made independently controllable.

Various feeding mechanisms may be employed, but as shown in Fig. 1, the feeder may comprise a screw conveyor 15 which is mounted in a horizontal cylindrical extension 16 of the tube 11 forming the inlet port 11. The conveyor 15 is mounted in suitable bearings and driven by a pulley or other suitable device 17 fixed on the end of the shaft 18 which projects through the end wall 19 of the inlet chamber 16. A hopper 20 communicates with the interior of the chamber 16 for feeding material to the screw from the bin 21 located thereover. The hopper 20 is larger than the reduced end 22 of the bin, and the parts are so associated that material feeding from the bin into the hopper will rest in repose on the side walls of the hopper and form an effective seal against the admission of air to the reaction chamber 10. It will also be noted that the innermost end of the screw 15 is located at a considerable distance from the inside wall of the reaction chamber 10 so that the ore material may rest in repose on the horizontal inside wall of the cylinder constituting the inlet port 11. In this way, an air seal is formed by the ore material itself. Any hydrochloric acid gas which seeps into the inwardly moving ore material will be absorbed therein, and the slight amount of air which enters in the pore spaces of the ore will be immaterial in its effect on the process.

At the outlet end of the reaction chamber 10, the walls are preferably tapered inwardly to form the frusto-conical portion 25 which aids in supporting the weight of the ore material above it and in controlling the passage of the iron chloride from the reaction zone. The member 25 is preferably double walled, as illustrated, so that water or other cooling fluid may be passed into the space formed between the inner wall 25 and the outer wall 26 and circulate through this annular space by means of the inlet pipe 27 and the outlet pipe 28 suitably connected thereto and to a fluid circulating device, such as a pump. If desired, this water jacket, or a separate one, may be made to surround a part or all of the rest of the wall 10 and so be employed to control the reaction effectively. Water or gas of the required temperature is supplied to this jacket. This serves to cool the iron chloride to a temperature at which it will not decompose when it meets the oxygen of the air. In this cooled zone, the iron chloride may take up water of reaction as crystalline hydrated iron chloride, and this compound will remain in a stable condition until it is again heated to a point at which the iron chloride will melt and dissolve in its water of crystallization or decompose by reaction with air at a higher temperature.

An air seal for the lower end of the reaction chamber may be provided by means of the endless belt 30 made of suitable material which is mounted on the positively rotated rollers 31 which are so located that the belt is positioned closely adjacent to the outlet orifice 12, whereby material passing downwardly through the reaction chamber rests on the upper portion of the belt and here again forms an effective air seal, as will be evident. The belt is to be suitably rotated, as by means of a pulley and a driving belt 32. The rate of movement of this belt 30 will be determined by the speed at which the material should be removed from the reaction chamber and yet maintain the required temperature and chloridizing conditions within the ore bed located within the chamber. This rate will be suitably controlled by any device adapted for the purpose, which need not be herein illustrated or described. It, however, is an important feature of this invention that the inlet feeding device 15 and the outlet removal device 30 shall be separately and independently controlled and that the rate of movement of each may be suitably adjusted, as is required. It will also be understood that other types of feeding devices, such as a plunger or a screw feed, may be employed at either the exit or the entrance end of the reaction chamber.

The reaction of iron oxide with the chloridizing gas forms iron chloride, and this may take up some of the water of reaction as water of crystallization, and especially in the lower cooled zone. The iron chloride and other ore metal compounds which may be formed tend to expand; hence, it is desirable to prevent the expanding, pulverulent material from forming a dense, massive cake. To this end, a stirring device is employed to agitate the material, and the feed of the material into and out of the reaction chamber is so regulated that ample space is left therein for the expansion. The stirring device may be of suitable construction, but it preferably comprises revolving arms 35 mounted in staggered relationship, as shown, on the positively rotated vertical shaft 36.

This shaft 36 passes through a packing gland 37 in the cover 13 and is mounted in a suitable bearing 38 secured on the top of the apparatus and a lower bearing 39 mounted on arms 40 projecting inwardly from the water-jacketed casing member 25. The upper bearing 38 comprises both radial and thrust members which serve to carry the weight of the shaft and stirring arms. The shaft is rotated by suitable mechanisms, such as the driving gears 42 and 43, which are in turn driven by a pulley 44 on one end of the short shaft 45 carrying the gear 43, this shaft being suitably mounted in a bearing on an arm 46 projecting upwardly from the casing cover.

The stirrers 35 are not intended to feed the material through the casing but merely to keep it agitated and to prevent the material from packing together and forming a solid mass. To this end, each stirrer is provided with a downwardly projecting flange 50, and the parts are so arranged that the depending flanges constitute scrapers which revolve closely to the inner cylindrical wall of the casing 10. The scrapers of the alternate stirring arms overlap one another so that the entire casing wall will be kept clean. The stirrers 53 at the bottom end of the shaft will have their scrapers shaped suitably to insure cleaning the inner surface of the frusto-conical members 25, as illustrated. These stirring arms may be suitably mounted on the vertical shaft 36, as by means of collars 55 which are integral with the arms 35 and surround the shaft. These are held immovable relative thereto by means of the set screws 56, as will be readily understood. A cap 58 is suitably secured to the vertical shaft, and this has a projecting flange overlapping the bearing member 39 so as to keep the pulverulent member within the casing from getting into the bearing. Various other mechanical provisions may be employed, within the knowledge of experts in this art, to insure the proper carrying on of this process.

One of the main features of this invention involves introducing the reagent gas into a deep or large bed of iron oxide or other ore material being treated. For this purpose, I may employ a gas inlet pipe 60 which communicates with an annular chamber 61 surrounding the cylindrical wall 10. This may be suitably formed, as by means of the outwardly projecting flange members 62 and 63 which are connected by the surrounding ring 64 to make a gas-tight annular chamber therebetween. The gas pipe 60 is suitably connected to this ring for passing gas therethrough. The gas is introduced into the reaction chamber through small port holes 65 formed in the wall 10, these being spaced around the annulus 61 so as to provide a fairly even distribution of gas upon all sides of the reaction chamber. A depending flange 67 of frusto-conical shape is fixed to the inner wall 10 and is so located as to divert the descending columns of pulverulent material from contact with the gas ports 65 and to create a space under this depending flange which is substantially free from ore material and so forms an annular zone of gas. This pocket of gas beneath the flange 67 has complete access to the ore material around the bottom end of the flange, and the gas will readily permeate the pores in and between the ore particles adjacent thereto and so pass in all directions through the powdered material and be absorbed thereby.

Since the expansion of the iron oxide as it is being chloridized may in some cases of improper operation serve to close some of the gas ports 65, special provision has been made for opening these ports as desired. This involves, in the showing of Figs. 1 and 2, small ports 70 in the chamber wall 64 which are located opposite the gas ports 65 so that a rod may be thrust through any outer port 70 and the corresponding inner port 65 to remove any material encrusted in the port 65. In order to prevent the passage of gas outwardly through these ports, a ball valve is provided. This constitutes a ball 71 fitting and closing the opening 70, which rides on a slotted wall 72 located within the valve chamber, the slot in this wall being, of course, in alignment with the two ports for the passage of the poker or rod therethrough. The ball is moved up the rails formed by the slotted wall 72 when the rod is thrust through the outer port, but falls back into a sealing position when the rod is removed.

As a modification of the port-cleaning device, I may employ the construction shown in Fig. 3, which comprises a rod 80 slidably mounted within a bushing or boss 81 in the end wall 64. The gas port 82 in this construction is formed in a boss 83 which has openings 84 therethrough communicating with the port 82 for the passage of gas therethrough. The rod 80 is slidable within this port 82 but it is not long enough to close the openings 84 during the normal position of the rod. The rod is held outwardly in this inoperative position by means of a spring 86 engaging the head 87 of the rod and pressing against the outer portion of the boss 81. A collar 88 on the rod holds it in proper location against the pressure of the spring. By means of this construction, all that is necessary to do for cleaning out the gas ports is to strike the plunger head 87 and push the rod in against the pressure of the spring, forcing it through the gas port 82 and then allowing it to spring back into position.

It will now be appreciated that when hydrochloric acid gas is passed into the device and pulverized or granular iron oxide, or material containing the same, is fed through the inlet port, the heat of reaction raises the temperature within the casing, and this temperature may be regulated in part by the rate at which the various materials are passed into and from the casing. The heat may be conserved by an insulating jacket constituting the outer wall 90 which forms an annular chamber surrounding the casing 10 and is adapted to hold suitable insulation. If desired, heating or cooling fluids may be circulated therethrough, as may be needed to maintain proper conditions within the apparatus.

Since the reaction causes the formation of water and the heat in the apparatus vaporizes it, a suitable controllable outlet for this steam and any residual gases is provided. For this purpose, one may employ various devices, such as a pipe 95 provided with a hand control valve which passes through the cover 13 and communicates with the space within the chamber. If desired, a pressure regulator may be employed so that gases cannot escape, except under a certain predetermined pressure. It is, however, desirable to afford such an exit for the steam formed in the apparatus that conditions will be maintained suitable for the production of the iron chloride. By limiting the amount of water present, I may prevent the formation of a crystalline product having a high number of molecules of water of crystallization which melts at a low temperature; but it is not ordinarily necessary to maintain conditions which prevent the melting or the volatilization of the iron chloride. Any volatilized fume or melted material will be caught in the colder portions of the ore bed.

In the form of apparatus shown in Fig. 1, the gas is introduced adjacent to the lower end of the apparatus so that a considerable portion of the gas is required to flow in a counterflow relation to the slowly descending pulverized ore material toward the upper end of the device. In the modification illustrated in Fig. 4, the gas is introduced into the space at the upper end of the apparatus. The inlet for the gas may constitute simply a pipe 100 which connects with a port through the casing wall 10 above the ore material which lies within the reaction chamber. In this construction, the strong hydrochloric acid gas and the fresh iron oxide meet at the upper end of the reaction chamber, and the reaction is violent and produces a considerable amount of heat which is absorbed by the ore material. This insures a sufficiently high temperature at the inlet end so that the water vapor is immediately evolved as steam and passes off through the water vapor outlet, which may be a pressure controlled valve 102.

Figures 4, 6:
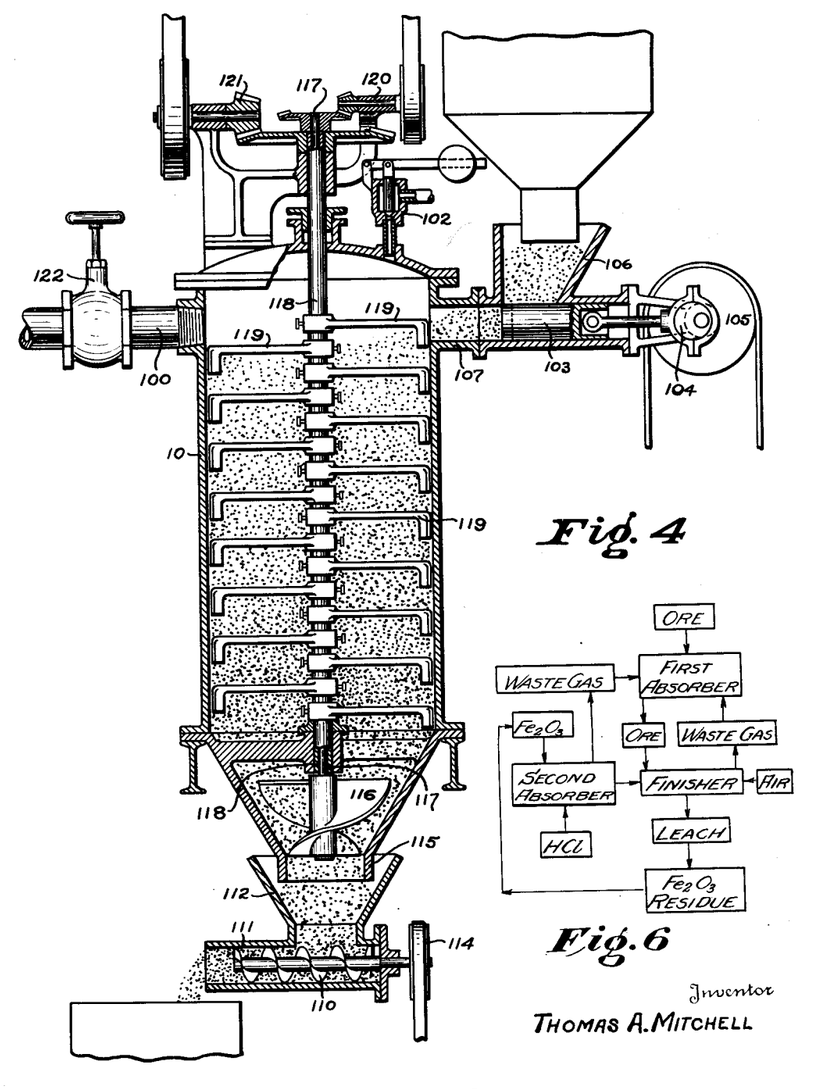
Fig. 4 is a vertical section, similar to Fig. 1, of a modification showing the gas inlet at the top of the apparatus.
Fig. 6 is a flow diagram indicating an alternative process.

The apparatus shown in Fig. 4 may be substantially the same as that in Fig. 1 in other particulars, but in order to illustrate further modifications of the device, the feed at the entrance end has been shown as comprising a plunger 103 which is reciprocated by an eccentric 104 suitably driven by a belt and pulley 105. This plunger passes back and forth across the opening at the lower end of the hopper 106, as is evident from inspection of the drawings, and serves to push material through the feed port 107. The plunger 103 stops sufficiently short of the end of the port 107 so that a considerable amount of ore material may be left within the entrance tube 107 and thus forming an effective air seal, as above described. The outlet feed device may comprise a screw conveyor 110 suitably mounted for rotation within the cylindrical casing 111 beneath the hopper 112. This screw conveyor is driven by the belt and pulley 114, and the parts are suitably constructed for the purpose, as will be readily understood. The hopper 112 is located beneath the reduced end portion of the casing which is shown as comprising a single wall 115 of frusto-conical shape. This wall projects into the upper end of the hopper 112 so that the descending material will form an air seal. As an aid to discharging the material from the casing, I may utilize the screw shaped member 116 which is suitably mounted on the lower end of a shaft 117 which is mounted for rotation within a rotatable sleeve 118 which carries the stirrer arms 119. These parts are mounted and driven substantially the same as the corresponding parts shown in Fig. 1, except that the shaft 117 and the sleeve 118 have separate belt driven gear mechanisms 120 and 121, as shown, whereby the stirrers and the screw 116 may be revolved at separate and controllable rates.

In view of the above explanation, the application of this method and apparatus to the treatment of ore materials will now be appreciated. In operating the apparatus, the flow of hydrochloric acid gas is regulated by means of the valves 122, and the feeds of the incoming pulverulent ore material, or iron oxide, as well as the outgoing material, are so regulated that the major portion of the gas is absorbed in the ore bed and the temperature is raised to the required point, which may be between 100 and 182° C. This latter temperature is to be interpreted as that temperature at which the iron chloride could not be formed under the conditions of the process. The outlet valve for the steam as well as the residual gases is regulated to insure removal of the excess of water which is held as steam. This insures the production of a dry material. In order to keep the mass in granular or pulverulent form, the bed is continuously agitated during the reaction. Because of the absence of air, no material amount of iron chloride will be decomposed and reconverted to iron oxide. Any dissociation of ferric chloride taking place results in the partial chloridization of the other metal values.

Figure 5:
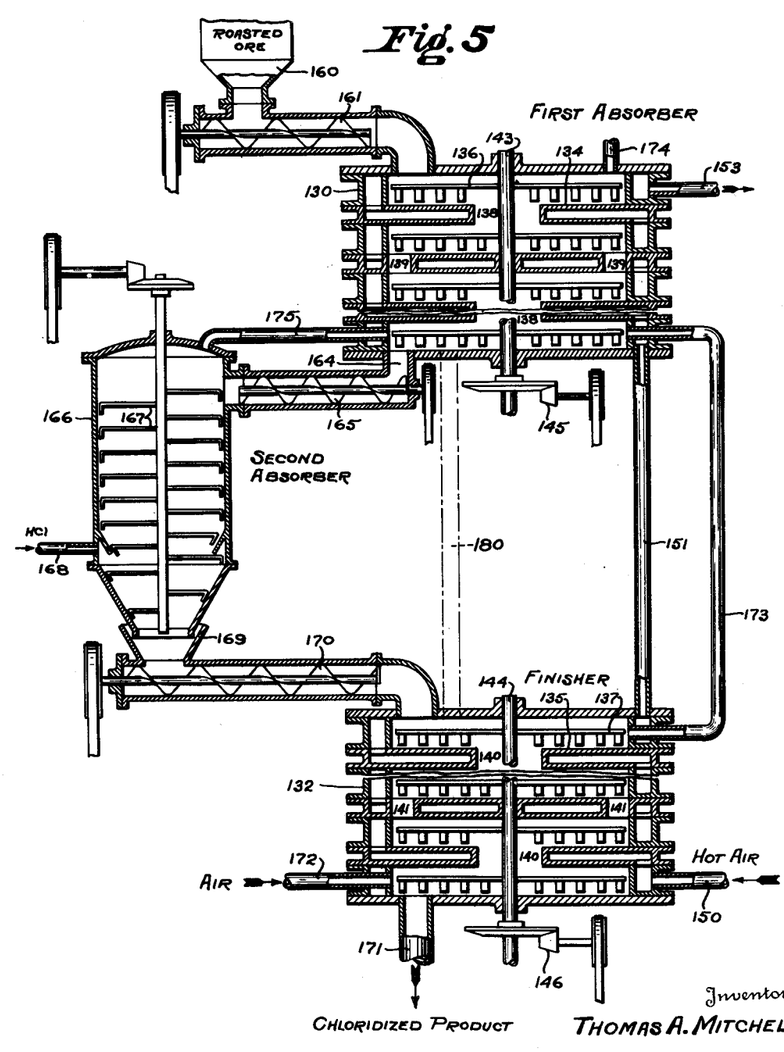
Fig. 5 is a diagrammatic illustration of a method of chloridizing in which this apparatus is employed.

Referring now to Fig. 5 of the drawings, I have there illustrated diagrammatically how the apparatus and method for making iron chloride at a high temperature may be employed for chloridizing an ore material, and wherein certain advantages and special features lie, as will be apparent from the following disclosure.

A large number of ores contain iron in one form or another, such as the pyritic sulfide ores. Hence, the standard roasting operation employed to remove sulfur from a sulfide ore will result in the development of iron oxide in either the ferrous or ferric condition. In accordance with this process, it is desirable to roast such an ore under low temperature conditions, and in such a manner as to produce a granular or pulverulent material which is not vitreous or sintered, so that the roasted material may be easily treated with the chloridizing gases thereafter employed to produce iron and other metal chlorides in the roasted material. The iron chloride may be formed for the primary purpose of later producing a gaseous chloridizing agent, which may be either hydrochloric acid gas or nascent chlorine. This is accomplished by heating the ore material containing the iron chloride with oxygen and in the presence of sufficient water to act as a catalytic agent in the development of nascent chlorine or to produce hydrochloric acid, as may be required. In the presence of an excess of oxygen, ferric and ferrous chlorides will produce nascent chlorine, while the reaction with water will produce hydrochloric acid.

This invention is applicable to various types of ore materials containing sulfides or other compounds of such metals as zinc, copper, lead, tin, iron, silver, gold, manganese, antimony, nickel, cadmium, caesium, lithium, chromium, zirconium, and particularly those metals whose compounds are chloridizable by ferric chloride, chlorine or hydrochloric acid gas. As a specific example illustrating the process as applied to a complex sulfide ore, an ore containing zinc, lead and iron sulfides may be chloridized effectively in the following manner: The ore is first pulverized to a suitable size and preferably to a finely divided condition, such as will pass through a screen of 100 meshes to the linear inch, and it is then roasted in accordance with suitable procedure, and preferably at a low temperature or autogenously and under conditions whereby the material is maintained in a pulverulent state. The roasting operation need not be carried on to completion, but four or five or more per cent of residual sulfide sulfur may be left in the ore. Such a roasting operation may result in the formation of both sulfates and oxides of the various ore metals but, if desired, various procedures may be employed to insure the formation of a roasted product containing substantially no sulfates of iron and zinc. If desired, the ore may be roasted under such conditions as to produce ferrous oxide, in which case the subsequent treatment will form some ferrous chloride, and this may be employed to develop hydrochloric acid gas and/or chlorine for the final chloridizing step. It is preferable, however, to employ ferric oxide and make ferric chloride therefrom because of the higher chloridizing value thereof.

The roasted material may be chloridized as indicated diagrammatically in Fig. 5 of the drawings. The apparatus there shown comprises three main parts, the first or upper portion of the apparatus being an absorber for the residual chloridizing gases, and wherein zinc oxide is converted to the chloride. Ferric oxide is not chloridized in the presence of zinc oxide; hence, the formation of the ferric chloride is conducted in the second absorber stage. The final or finishing stage serves for removing the combined chlorine from the iron chloride and using it effectively as a chloridizing reagent. The first-stage absorber and the final-stage finisher operations may be carried on in apparatus of the type diagrammatically illustrated, which comprises jacketed casings 130 and 132, through the jackets of which heated liquids or gases may be conducted for controlling the temperatures of the reactions. The material is passed over a series of shelves 134 in the first absorber and 135 in the finisher which are so arranged that the ore may be moved downwardly from one shelf to another by a series of rake arms 136 and 137. In this way, the material is fed from shelf to shelf through the series of staggered openings 138 and 139 in the absorber and 140 and 141 in the finisher. The rake arms are suitably mounted on vertical shafts 143 and 144 and revolved by any suitable driving mechanisms 145 and 146, as will be understood by those skilled in the art. The shelves and casing of the finisher and the absorber may be hollow members forming interconnected air passages. Hot air or other heated fluid may be introduced through the pipe 150 to the hollow space in the finisher, thereby forming a heated jacket for controlling the temperature conditions within the finisher and for absorbing heat from the reacting materials and conducting it to the first absorber, as illustrated. A suitable pipe connection 151 connects the upper portion of the finisher chamber jacket with the bottom portion of the first absorber chamber jacket, and the heated gases are ultimately removed through the pipe 153 from the first absorber chamber.

The roasted ore is introduced from the hopper 160 by means of a suitable screw conveyor 161 to the upper shelf 134 of the absorber, and the material is then passed downwardly over the series of shelves of the absorber and finally through the outlet pipe 164 and by means of the screw conveyor 165 to the closed container 166, constituting a second absorber, which may be made in conformity with the disclosure shown in Figs. 1 to 4 inclusive, and which need not be specifically described again. The stirring arms 167 therein keep the material agitated and in granular form as it passes downwardly through this chamber and is being treated by the hydrochloric acid gas introduced through the controlled inlet pipe 168. The ore material is ultimately removed through the hopper 169 and carried by means of the screw conveyor 170 to the top section of the finisher. It is finally removed from the latter through the outlet pipe 171.

Air is admitted at a suitable rate through pipe 172 into the bottom portion of the finisher apparatus, and this carries sufficient oxygen in excess to convert all of the iron chloride to iron oxide, and preferably to ferric oxide, with the resultant development of the chloridizing gases in the finisher chamber. Heat is applied to the ore material for this purpose by means of the inlet pipes 150. The residual gases are conducted from the top of the finisher chamber through pipe 173 to the bottom of the first absorber, it being noted that these gases are by-passed around the second absorber in which the iron chloride is formed; and the waste gases are ultimately removed through pipe 174 from the top of the first absorber. A pipe conneciton 175 may conduct the excess of steam and other gases from the iron chloridizing chamber or second absorber 166 to the bottom of the first absorber, but this steam will not serve to wet the ore therein because of the high temperature conditions maintained, as will be described.

As an alternative procedure and construction, the ore material may be conducted directly from the first absorber to the finisher, without going through the iron chloride making apparatus, as shown in the flow diagram of Fig. 6. In that case, the pipe connection 164 (Fig. 5) will be removed from the second absorber and connected to a suitable hopper for the supply of iron oxide, and this iron oxide may be derived from the finisher residue after the valuable ore metal chlorides have been leached or otherwise removed therefrom. This residue will consist largely of iron oxide, and preferably ferric oxide, along with the ore gangue and other materials. A desired portion of this residue may be reintroduced into the second absorber 166 in granular or pulverulent form and a sufficient portion of the iron oxide therein will be converted to iron chloride for the finisher reactions. This procedure is particularly desirable where the ore being treated is low in its iron content, or where it is not desirable to pass all the ore, which has been partially chloridized in the first absorber, through this hot temperature zone where the iron chloride is made.

In accordance with the process illustrated in Fig. 5, the roasted ore is introduced into the upper end of the first absorber chamber and there meets the weak gases coming from the finisher and/or the second absorber, or other gases may be suitably introduced for the purpose. The zinc oxide in particular will be chloridized in this upper section of the apparatus. If the content of zinc is high, then the temperature in this first absorber will be maintained sufficiently high to vaporize enough water of reaction to prevent the material from becoming wet, with a resultant formation of the viscous, syrupy condition. A temperature of 80° C. or higher has been found suitable for the purpose, provided the air and other gases present are passed through the chamber at a sufficiently high rate to carry off the vapor therein and keep the ore in a substantially dry condition. It will be appreciated that moisture remains to some extent in the ore, but it is not desired to have the ore moist to the touch or to contain any large quantity of water, and precautions should be taken to insure such a moisture control, as by removal of the excess water to maintain the ore in a substantially dry pulverulent condition. If the ore material being treated in the first absorber permits it, the temperature may be raised above 100° C., but at this temperature and in the presence of the excess of air coming from the finisher, no iron chloride, if formed, will remain in the product, since it will react with oxygen to form iron oxide.

The roasted ore may contain a considerable amount of residual sulfide sulfur, but this process is particularly serviceable for converting the refractory or difficultly chloridized materials to soluble compounds. When the partially chloridized material is passed into the second absorber for making iron chloride, it is found that under the high temperature conditions of this stage, some of the zinc sulfide and other refractory materials are solubilized by the reagents there present. It is considered that the ferric chloride may react directly with the refractory compounds present, with the resultant reduction of the reagent to ferrous chloride and the formation of ore metal chlorides, or it may decompose to some extent where the temperature has been raised above the critical point or it may react with such oxygen or water as is present to form chlorine or hydrochloric acid. This stage of the apparatus, therefore, performs some of the chloridizing action which would otherwise have to be accomplished in the finisher, thus reducing the time and expense of the finisher treatment.

The rate of movement of the material through the second absorber 166, and the amount of hydrochloric acid gas introduced thereto will be controlled, depending upon the amount of ferric chloride required in the finisher zone. It may be unnecessary to convert all of the iron oxide to iron chloride. The material containing the iron chloride is in a dry and pulverulent condition, and the moisture remains only as steam or water of crystallization or hydration of compounds which may be present. When this ore material is passed into the upper end of the finisher chamber and meets a stream of oxygen at a temperature above its decomposition point, the ferric chloride will be decomposed to form chlorine gas and/or hydrochloric acid gas, depending upon the amount of moisture present. It is desirable to control the temperature in the finisher so that the ferric chloride will first melt in its water of crystallization, if the material has crystallized in that form, and thus carry this strong reagent into intimate contact with the ore where it may react directly with some of the difficulty chloridized materials. As this material is further heated, the small amount of water present will be evaporated and removed through the outlet pipe 173. Therefore, the moisture content in the finisher atmosphere is controlled and materially limited. The material passes downwardly over the shelves of the finisher, and is gradually heated to a temperature at which the ferric chloride, as well as any ferrous chloride which may be present, is decomposed in the presence of the oxygen and water to form the chloridizing gas and iron oxide. At the upper end of the finisher, the water vapor there present may result in the formation of hydrochloric acid gas, but this will go directly to the first absorber and thereby used up in converting the ore metal oxides to the chlorides.

The hot air entering through pipe 150 into the finisher chamber is preferably maintained at a temperature well in excess of the decomposition point of the iron chlorides, and preferably in the vicinity of 250 to 300° C., but below the volatilization point of zinc chloride or other ore metal chlorides which it is desired to retain in the unvolatilized condition. Consequently, as the material descends over the finisher shelves, it meets more and more oxygen and the moisture is gradually dried out of the material, so that at the lower portion of the finisher, the major reaction is that of forming nascent chlorine gas, there being sufficient moisture present to serve as a catalytic agent to aid in this reaction. Owing to the excess of oxygen present, the ferrous oxide formed by the reaction will be converted to ferric oxide, and will thus be a water insoluble material which may be easily recovered and separated from the desired ore metal chlorides.

It will now be appreciated that the particular method of making iron chloride in accordance with the description relative to Figs. I and 4 is of special applicability to the general treatment of ores, and particularly complex ores, which contain iron as an impurity. The process is efficient, and will result in the recovery of substantially all of the desired ore metals; and the apparatus described is capable of close control so that the reactions may be carried on as intended. Various other advantages will be apparent to one skilled in the art. It is to be understood that the use of the chemical terms "iron oxide" and "iron chloride", as found in the claims, is to be interpreted as covering ore materials containing iron oxide and chloride and that the term "ore material" is likewise to be interpreted as covering iron oxide in the pure condition or associated with various other materials. The process is applicable whether or not the iron oxide is pure or contains ore gangue and various chloridizable ore metal compounds. It is especially applicable where inerts, such as silica and so forth, are present in the material being treated. It is also to be understood that the maximum temperature specified in the claims refers to that temperature in the second absorber at which the iron chloride will form and not be decomposed under the theoretical conditions governing the process, and that some of the material may decompose by reaction with the small amount of air present. It is also within the scope of my claims to employ temperature conditions which directly cause the decomposition of a portion of the iron chloride with a resultant beneficial effect in chloridizing difficultly treated materials in the ore. Yet, in that case, the temperature of a considerable portion of the ore material is sufficiently low so that some iron chloride will remain in the product issuing from the apparatus.

Having thus described my invention, what I claim as new and desire to secure by Letters Patent is:

1. The method of converting iron oxide to iron chloride comprising the steps of treating a deep bed of the iron oxide with strong hydrochloric acid gas, while preventing the admission of a material amount of air thereto, maintaining conditions whereby the heat of reaction is absorbed in the material being treated and creates a temperature above 100° C. but below the point at which the iron chloride will decompose under the conditions of the process, and removing the excess of water as steam from the reaction zone.

2. The method of making iron chloride from iron oxide comprising the steps of maintaining a deep bed of pulverized material containing iron oxide and agitating it and passing it continuously through a closed reaction chamber, while preventing the admission of a material amount of air thereto, and introducing into the bed of material strong hydrochloric acid gas in quantity sufficient to develop a comparatively high temperature from the heat of reaction, while confining the heat to maintain a temperature above 100° C. but below a point at which iron chloride cannot be formed under the conditions of the process.

3. The method of making ferric chloride from ferric oxide comprising the steps of forming a deep bed of ferric oxide and passing strong hydrochloric acid gas through said bed, while preventing the admission of material quantities of air thereto, regulating the rate of flow of the gas into the reaction chamber and causing the heat of reaction to be confined within the material so as to produce a temperature above 100° C. but below a point at which ferric chloride cannot be formed under the conditions of the process, and removing steam from the reaction zone, thereby producing a dry pulverulent material containing ferric chloride.

4. The method of claim 4 in which a pulverized material containing ferric oxide is fed to and removed from the reaction chamber and the rates of feeding and removing the material are separately controlled so as to maintain the required temperature conditions in the reaction chamber and to leave adequate space for expansion of the material as the ferric chloride is formed.

5. The method of treating iron oxide comprising the steps of forming a deep bed thereof, introducing fresh material to one side of the bed and removing treated material from the other side, while preventing the admission of any material amount of air, introducing hydrochloric acid gas into the bed at a point remote from the exit side thereof, controlling the rate of gas flow into the bed so that the gas may be substantially wholly absorbed by the iron oxide, and confining the heat of formation of iron chloride within the ore bed and controlling the temperature thereof so as to maintain the temperature above 100° C. but below 182° C. or that point at which the ferric chloride will be decomposed under the conditions of the process.

6. The method of making iron chloride from iron oxide comprising the steps of treating the iron oxide with hydrochloric acid gas in the absence of a material amount of air, maintaining a temperature above 100° C. but below that at which iron chloride cannot be formed under the conditions of the process and thereby forming iron chloride while removing water of reaction as steam, and thereafter cooling the material to a point at which the iron chloride is stable in the presence of air.

7. The method of claim 5 in which the water vapor is removed as steam from the zone of reaction and the pressure of the steam and other gases in the chamber is controlled.

8. The method of treating a pulverized ore material containing ferric oxide and a chloridizable ore metal compound comprising the steps of passing the ore material in a thick bed through a reaction chamber, while preventing the access of any material amount of air thereto, passing strong hydrochloric acid gas through the bed of material, while maintaining the rates of flow of the gas and the material such as to cause a substantially complete absorption of the gas within the bed and to insure that the heat of formation of the iron chloride will create a temperature above 100° C. but below a point at which ferric chloride cannot be formed, exhausting steam from the reaction chamber, whereby any ferric chloride formed with water of crystallization will have a high melting point, agitating the material during the reaction to maintain it in a granular condition, and causing the iron chloride to be formed in the presence of said compound and the latter to be chloridized.

9. The method of treating an ore material containing iron oxide and a chloridizable ore metal compound comprising the steps of passing the material in pulverized condition through a reaction chamber, while preventing the admission of a material amount of air thereto, introducing strong hydrochloric acid gas rapidly into the the fresh ore material as it enters the reaction chamber and causing its heat of formation to be absorbed therein so as to maintain a temperature above 100° C. and remove water of reaction from the chamber as steam, but limiting the maximum temperature to a point below but in the vicinity of that at which the iron chloride will not be formed under the conditions of the process, and causing the iron chloride to be produced and to remain in the presence of said compound, whereby the latter is chloridized.

10. The method of chloridizing an oxidized ore material containing ferric oxide and a residual sulfide or other chloridizable refractory compound comprising the steps of treating the roasted ore rapidly with strong hydrochloric acid gas while maintaining the ore in a large pulverulent mass and excluding therefrom a material amount of air and the weak chloridizing gases derived from other stages of the process, confining the heat of reaction within the ore material and maintaining the temperature materially above 100° C. but at a point below that at which iron chloride will decompose under the prevailing conditions and concurrently causing the formation of ferric chloride and the conversion thereby of the refractory compound to a chloride with the resultant production of ferrous chloride, while the ore is maintained in a substantially dry and gas-permeable condition.

11. The method of chloridizing a complex oxidized ore material containing ferric oxide and a refractory chloridizable compound comprising the steps of treating the material in a large mass with strong hydrochloric acid gas and permitting the material to attain as high a temperature as will result from the mass action thereof, while limiting the amount of oxygen present so as to prevent material dilution of the acid gas or cooling of the reacting material, and maintaining the ore materials in intimate contact under the conditions of the process and causing the formation of ferric chloride and immediately thereafter its reduction to ferrous chloride by reaction with the refractory compound with a consequent conversion of the latter to a chloride.

12. The method of chloridizing a complex oxidized ore material containing ferric oxide and a chloridizable refractory compound comprising the steps of providing a deep bed of the ore material in a pulverized condition and passing it continuously through a chloridizing zone while agitating it to maintain a gas-permeable condition, introducing strong hydrochloric acid gas rapidly thereinto, while excluding material amounts of air and diluting gases, confining the heat of reaction and heating the material to a point above 100° C. and thereby evaporating water of reaction, controlling the rates of ore and gas flow and maintaining the temperature below that point at which ferric chloride cannot be formed under the conditions of the process, and thereby forming ferric chloride in situ and concurrently causing the chloridization of the refractory compound with the resultant production of ferrous chloride.

13. The method of claim 12 in which the ore material is introduced into and removed from the chloridizing zone at independently controllable rates which are so controlled that with respect to the rate of gas flow and the temperature, the deep bed may be maintained and the ore material may be kept in a loose granular condition and continuously chloridized.

14. The method of claim 12 in which the ore material is thereafter heated with air to convert the iron chlorides present into ferric oxide and produce nascent chlorine, and the chlorine is passed into the ore material and caused to chloridize further ore values.

15. The method of chloridizing an oxidized ore material containing ferric oxide and a chloridizable refractory compound of zinc comprising the steps of providing a deep bed and a large mass of the ore material in pulverulent form, passing strong hydrochloric acid gas rapidly into the mass, confining the heat of reaction and permitting the ore material to attain a temperature above 100° C. but below that at which ferric chloride cannot be formed, while limiting the amount of air and other gases present so as to prevent material dilution of the reagent gas or cooling of the ore material, and causing the formation of ferric chloride in situ in a substantially dry material and the concurrent conversion at a high temperature of the refractory zinc compound to zinc chloride with the resultant formation of ferrous chloride.

16. The method of claim 15 in which the ore material is passed into and through a chloridizing zone and the rates of ore and gas flow are so regulated as to maintain the required temperature.

17. The method of chloridizing a sulfide ore comprising the steps of roasting it under oxidizing conditions and providing a granular, gaspermeable product containing ferric oxide and a residual chloridizable sulfide or other refractory compound, forming a deep bed of the ore material, treating it in a substantially dry condition with strong hydrochloric acid gas and permitting it to absorb the heat of reaction and attain a temperature between 100° and 182° C. while excluding air and weak chloridizing gases and controlling the atmosphere to insure the formation of ferric chloride within a substantially dry ore material, and concurrently causing the ferric chloride to convert the refractory compound to a chloride, and thereafter heating the ore material with air to a temperature at which any iron chloride present will react to produce a gaseous agent containing the chlorine atom and iron oxide.

18. The method of treating a roasted sulfide ore containing iron oxide and a chloridizable compound of a valuable ore metal comprising the steps of treating the ore material in a deep bed with strong hydrochloric acid gas without admitting a material amount of air, while maintaining the temperature above 100° C. but below a point at which the iron chloride will decompose, removing the excess of water from the reaction zone and thereby producing a dry material containing iron chloride, and thereafter treating the ore material with air at a temperature at which the iron chloride will react to produce a gaseous agent containing the chlorine atom for chloridizing the ore metal compound.

19. The method of treating a roasted sulfide ore containing ferric oxide and a chloridizable ore metal compound comprising the steps of treating the ore material in a deep bed with hydrochloric acid gas while excluding any material amount of air, maintaining a temperature above 100° C. but below a point at which ferric chloride cannot be formed under the conditions of the process, thereby forming ferric chloride in the presence of unchloridized ingredients of the ore and causing a partial chloridization thereof, and subsequently treating the ore material with air at a temperature at which the ferric chloride will decompose and forming nascent chlorine therefrom to chloridize a further portion of the ore.

20. The method of chloridizing an ore material containing iron oxide and a chloridizable compound of a valuable ore metal comprising the steps of treating the ore material with hydrochloric acid without admitting a material amount of air thereto, while heating the material to a temperature above 100° C. but below the point at which the iron chloride thus formed will decompose under the conditions of the process, and thereafter treating the ore material with oxygen and water at a temperature required to form iron oxide from the iron chloride therein and produce a chloridizing agent including hydrochloric acid gas which serves to chloridize said ore metal compound.

21. The method of treating an ore containing the sulfides of iron and a chloridizable ore metal comprising the steps of roasting the ore under low temperature conditions to form iron oxide, but leaving residual sulfide sulfur therein, passing a deep bed of the roasted ore material through a chlorodizing zone while in a pulverulent condition, agitating it and simultaneously passing strong hydrochloric acid gas into the fresh ore material as it enters the zone, while excluding any material amount of air therefrom, maintaining a temperature above 100° C. but below a point at which iron chloride cannot be formed, removing the excess of water as steam and producing a dry ore material containing iron chloride, while partially chloridizing ingredients of the ore, and thereafter treating the ore material with oxygen at a temperature required to decompose the iron chloride and cause the development in the presence of said ore metal compound of a chloridizing agent containing the chlorine atom.

22. The method of treating a roasted sulfide ore material which has been chloridized by heating it with iron chloride and air and forming iron oxide comprising the steps of recovering a portion of the residue containing iron oxide, preliminarily chloridizing the same to form iron chloride, thereafter mixing the chloridized residue with further roasted sulfide ore material containing chloridizable compounds and then heating the mixture with oxygen and in the presence of water to a temperature at which the iron chloride will form iron oxide and a gaseous chloridizing agent containing the chlorine atom will be evolved in intimate contact with the ore.

23. The method of claim 22 in which the iron oxide residue is preliminarily treated with strong hydrochloric acid gas while air and weak gases from other stages are excluded therefrom, after which the iron chloride thus produced is added to ore material to be chloridized thereby.

24. The method of claim 22 in which the recovered residue contains ferric oxide and is treated with strong hydrochloric acid gas while air and weak gases from other stages are excluded therefrom and the atmospheric and temperature conditions are so controlled that crystalline hydrated ferric chloride is formed in the ore material.

25. The method of treating a roasted sulfide ore, which has been heated with iron chloride to form ferric oxide and provide chloridizing gas for treating ore metal values, comprising the steps of recovering a portion of the ore residues containing said ferric oxide and treating the same in pulverulent form with hydrochloric acid gas but in the absence of any material amount of air, while maintaining the temperature above 100° C. but below a point at which the iron chloride will decompose, and eliminating steam from the reaction chamber, thereby forming a substantially dry pulverulent material containing ferric chloride, and reintroducing this ferric chloride into a new batch of roasted sulfide ore to serve as a source of chloridizing gas for treating the same.

26. The method of treating a pyritic zinc sulfide ore comprising the steps of roasting the ore incompletely to produce oxides of iron and zinc, treating the same with hydrochloric acid gas to form zinc and iron chlorides and thereafter heating the material with oxygen to form iron oxide and a gaseous chloridizing reagent, characterized by the ore material being maintained in a substantially dry condition during the formation of the chlorides by steps which include heating the ore material to remove sufficient water of reaction while the zinc chloride is being formed to prevent the formation of a viscous mass, and causing iron chloride to be formed at a temperature above 100° C. but below that point at which it will decompose during the process, while removing the excess of water from the reaction zone, and further characterized by the iron oxide being treated in a deep bed of large mass by strong hydrochloric acid gas undiluted by air and the heat of reaction being confined and caused to aid the chloridization of both the iron oxide and the residual zinc sulfide.

27. The method of chloridizing a roasted sulfide ore containing ferric oxide comprising the steps of treating the roasted ore material in a first stage with residual chloridizing gases derived from later stages of the process to absorb the chlorine content thereof, then providing a deep bed of the ore material, treating it rapidly and in the absence of any material amount of air with strong hydrochloric acid gas while confining the heat of reaction therein and maintaining a temperature above the boiling point of water but below the point at which the iron chloride will decompose and thereby converting the ferric oxide to ferric chloride, exhausting the residual gases and steam from the reaction chamber and returning them to the first stage, and thereafter passing the ore material to a reaction chamber to which air is admitted in excess and maintaining the material at a temperature at which ferric chloride is not stable and nascent chlorine is evolved therefrom in the presence of unchloridized ore material, the residual gases being passed to the first stage of the chloridizing process.

28. The method of treating a complex sulfide ore containing zinc and iron sulfides comprising the steps of roasting the ore and providing a pulverulent mixture of zinc and ferric oxides, residual ore metal sulfides, refractory chloridizable zinc compounds and gangue, treating the ore material with a chloridizing gas while removing water which may be present or formed at such a rate, with respect to the capacity of the ore material to absorb it, that the ore remains in a substantially dry condition, thereafter passing the dry ore material into and through a chloridizing zone while it is maintained as a deep bed having a large mass, introducing strong hydrochloric acid gas into the mass to convert ferric oxide to ferric chloride, while limiting the amount of air and other diluting gases present so as to prevent material dilution of the reagent gas or cooling of the ore material, regulating the rates of ore and gas flow and causing the ore material to attain a temperature materially above 100° C. but below that point at which ferric chloride would be decomposed by heat under the conditions of the process, and causing the concurrent conversion of zinc sulfide and refractory compounds to zinc chloride with a resultant formation of ferrous chloride at said high temperature.

THOMAS A. MITCHELL.

hydrochloric acid gas while air and weak gases from other stages are excluded therefrom, after which the iron chloride thus produced is added to ore material to be chloridized thereby.

24. The method of claim 22 in which the recovered residue contains ferric oxide and is treated with strong hydrochloric acid gas while air and weak gases from other stages are excluded therefrom and the atmospheric and temperature conditions are so controlled that crystalline hydrated ferric chloride is formed in the ore material.

25. The method of treating a roasted sulfide ore, which has been heated with iron chloride to form ferric oxide and provide chloridizing gas for treating ore metal values, comprising the steps of recovering a portion of the ore residues containing said ferric oxide and treating the same in pulverulent form with hydrochloric acid gas but in the absence of any material amount of air, while maintaining the temperature above 100° C. but below a point at which the iron chloride will decompose, and eliminating steam from the reaction chamber, thereby forming a substantially dry pulverulent material containing ferric chloride, and reintroducing this ferric chloride into a new batch of roasted sulfide ore to serve as a source of chloridizing gas for treating the same.

26. The method of treating a pyritic zinc sulfide ore comprising the steps of roasting the ore incompletely to produce oxides of iron and zinc, treating the same with hydrochloric acid gas to form zinc and iron chlorides and thereafter heating the material with oxygen to form iron oxide and a gaseous chloridizing reagent, characterized by the ore material being maintained in a substantially dry condition during the formation of the chlorides by steps which include heating the ore material to remove sufficient water of reaction while the zinc chloride is being formed to prevent the formation of a viscous mass, and causing iron chloride to be formed at a temperature above 100° C. but below that point at which it will decompose during the process, while removing the excess of water from the reaction zone, and further characterized by the iron oxide being treated in a deep bed of large mass by strong hydrochloric acid gas undiluted by air and the heat of reaction being confined and caused to aid the chloridization of both the iron oxide and the residual zinc sulfide.

27. The method of chloridizing a roasted sulfide ore containing ferric oxide comprising the steps of treating the roasted ore material in a first stage with residual chloridizing gases derived from later stages of the process to absorb the chlorine content thereof, then providing a deep bed of the ore material, treating it rapidly and in the absence of any material amount of air with strong hydrochloric acid gas while confining the heat of reaction therein and maintaining a temperature above the boiling point of water but below the point at which the iron chloride will decompose and thereby converting the ferric oxide to ferric chloride, exhausting the residual gases and steam from the reaction chamber and returning them to the first stage, and thereafter passing the ore material to a reaction chamber to which air is admitted in excess and maintaining the material at a temperature at which ferric chloride is not stable and nascent chlorine is evolved therefrom in the presence of unchloridized ore material, the residual gases being passed to the first stage of the chloridizing process.

28. The method of treating a complex sulfide ore containing zinc and iron sulfides comprising the steps of roasting the ore and providing a pulverulent mixture of zinc and ferric oxides, residual ore metal sulfides, refractory chloridizable zinc compounds and gangue, treating the ore material with a chloridizing gas while removing water which may be present or formed at such a rate, with respect to the capacity of the ore material to absorb it, that the ore remains in a substantially dry condition, thereafter passing the dry ore material into and through a chloridizing zone while it is maintained as a deep bed having a large mass, introducing strong hydrochloric acid gas into the mass to convert ferric oxide to ferric chloride, while limiting the amount of air and other diluting gases present so as to prevent material dilution of the reagent gas or cooling of the ore material, regulating the rates of ore and gas flow and causing the ore material to attain a temperature materially above 100° C. but below that point at which ferric chloride would be decomposed by heat under the conditions of the process, and causing the concurrent conversion of zinc sulfide and refractory compounds to zinc chloride with a resultant formation of ferrous chloride at said high temperature.

THOMAS A. MITCHELL.

CERTIFICATE OF CORRECTION.

Patent No. 1,979,280.   November 6, 1934.

THOMAS A. MITCHELL.

It is hereby certified that error appears in the printed specification of the above numbered patent requiring correction as follows: Page 6, line 93, for "pipes" read pipe; and line 100, for "conneciton" read connection; page 8, line 27, claim 4, for "claim 4" read claim 3; and page 9, line 119, claim 21, for "chlorodizing" read chloridizing; and that the said Letters Patent should be read with these corrections therein that the same may conform to the record of the case in the Patent Office.

Signed and sealed this 12th day of February, A. D. 1935.

(Seal)

Leslie Frazer
Acting Commissioner of Patents.